US007727580B2

(12) United States Patent
Hirase et al.

(10) Patent No.: US 7,727,580 B2
(45) Date of Patent: Jun. 1, 2010

(54) METHOD OF MANUFACTURING ELECTRODE FOR LITHIUM SECONDARY BATTERIES

(75) Inventors: Masaki Hirase, Kobe (JP); Hiromasa Yagi, Nishinomiya (JP); Daizo Jito, Kobe (JP); Kei Kobayashi, Kobe (JP); Katsunobu Sayama, Kobe (JP)

(73) Assignee: SANYO Electric Co., Ltd., Osaka (JP)

( * ) Notice: Subject to any disclaimer, the term of this patent is extended or adjusted under 35 U.S.C. 154(b) by 984 days.

(21) Appl. No.: 11/390,477

(22) Filed: Mar. 28, 2006

(65) Prior Publication Data

US 2006/0228467 A1 Oct. 12, 2006

(30) Foreign Application Priority Data

Mar. 29, 2005 (JP) .............................. 2005-096441

(51) Int. Cl.
*B05D 5/12* (2006.01)
*B05D 3/12* (2006.01)

(52) U.S. Cl. .................... 427/115; 427/124; 427/172; 427/359; 429/27; 429/218.1

(58) Field of Classification Search ................ 427/58, 427/172, 294, 255.27, 248.1, 355, 356, 357, 427/359, 115; 429/27, 218.1
See application file for complete search history.

(56) References Cited

U.S. PATENT DOCUMENTS

| | | | | |
|---|---|---|---|---|
| 4,931,240 A * | 6/1990 | Tajima et al. | ................. | 264/81 |
| 5,456,000 A * | 10/1995 | Gozdz et al. | ................ | 29/623.2 |
| 5,641,591 A * | 6/1997 | Kawakami et al. | ....... | 429/231.5 |
| 5,780,181 A * | 7/1998 | Idota et al. | .................. | 429/332 |
| 5,834,052 A * | 11/1998 | Fukumura et al. | ............. | 427/58 |
| 6,019,802 A * | 2/2000 | Ishizuka et al. | ............ | 29/623.5 |
| 6,235,427 B1 * | 5/2001 | Idota et al. | ................ | 429/218.1 |
| 6,344,296 B1 * | 2/2002 | Ishii et al. | ................ | 429/231.8 |
| 6,387,561 B1 * | 5/2002 | Nemoto et al. | ................ | 429/51 |
| 6,475,680 B1 * | 11/2002 | Arai et al. | .................... | 429/340 |
| 6,534,219 B1 * | 3/2003 | Iijima et al. | ................. | 429/306 |
| 6,610,357 B2 * | 8/2003 | Endo et al. | ................... | 427/172 |
| 6,998,167 B2 * | 2/2006 | Nishijima et al. | ........... | 428/163 |
| 7,175,936 B2 * | 2/2007 | Kawamura et al. | ............ | 429/94 |
| 7,267,906 B2 * | 9/2007 | Mizuta et al. | ............... | 429/185 |
| 2002/0071913 A1 * | 6/2002 | Jen | .......................... | 427/299 |
| 2003/0059526 A1 * | 3/2003 | Benson et al. | ............. | 427/121 |
| 2004/0086774 A1 * | 5/2004 | Munoz et al. | ................. | 429/42 |
| 2005/0191554 A1 * | 9/2005 | Soga | .......................... | 429/232 |
| 2006/0275666 A1 * | 12/2006 | Chang et al. | ................ | 429/223 |

(Continued)

FOREIGN PATENT DOCUMENTS

JP 5-171412 A 7/1993

(Continued)

*Primary Examiner*—Bret Chen
(74) *Attorney, Agent, or Firm*—Kubovcik & Kubovcik

(57) ABSTRACT

A method of manufacturing an electrode for a lithium secondary battery in which a thin film of active material is deposited on a current collector is provided that eliminates adverse effects on the battery caused by protrusions adhered on an electrode surface. The method of manufacturing an electrode for lithium secondary batteries includes depositing a thin film of active material on a current collector using thin-film deposition equipment as shown in FIG. 1, and performing a compression process after depositing the thin film, whereby the heights of protrusions formed on the electrode surface are reduced.

8 Claims, 3 Drawing Sheets

U.S. PATENT DOCUMENTS

| | | |
|---|---|---|
| 2007/0077494 A1* | 4/2007 | Kobayashi et al. ..... 429/231.95 |
| 2008/0102359 A1* | 5/2008 | Kogetsu et al. ............ 429/129 |
| 2008/0176144 A1* | 7/2008 | Iwama et al. ................ 429/338 |
| 2008/0221629 A1* | 9/2008 | Morgan et al. ................ 607/2 |
| 2008/0226975 A1* | 9/2008 | Kang et al. ................ 429/122 |

FOREIGN PATENT DOCUMENTS

| | | |
|---|---|---|
| JP | 7-34224 A | 2/1995 |
| JP | 2004-204314 A | 7/2004 |
| JP | 2008004281 A * | 1/2008 |
| WO | 01/29912 A1 | 4/2001 |
| WO | WO2007038541 A1 * | 4/2007 |

\* cited by examiner

METHOD OF MANUFACTURING ELECTRODE FOR LITHIUM SECONDARY BATTERIES

BACKGROUND OF THE INVENTION

1. Field of the Invention

The present invention relates to a method of manufacturing an electrode used for lithium secondary batteries.

2. Description of Related Art

Silicon is a material that can be alloyed with lithium. Because of its large theoretical capacity, silicon has received attention as an electrode material that achieves high energy density for lithium secondary batteries. Published PCT Application WO01/029912, which is assigned to the assignee of the present invention, proposes a lithium secondary battery electrode in which a thin film composed of silicon is formed on a current collector, as an electrode for a lithium secondary battery that exhibits high charge-discharge capacity and good charge-discharge cycle performance.

However, in the process of forming the thin film used for the electrode, it is difficult to form a flat and smooth surface, and protrusions form on the surface. When such an electrode is used to fabricate a battery, the protrusions formed on the electrode surfaces penetrate the separator and come into contact with the counter electrode, causing a short-circuit failure of the battery.

Examples of the method of forming the thin film include CVD, sputtering, evaporation, and thermal spraying. In the following, vacuum evaporation is discussed, in which the above-described problem tends to occur noticeably.

Electron beam evaporation, which is one type of the vacuum evaporation, uses an evaporation system as illustrated in FIG. 1. The evaporation system has a supporting roller 2, a crucible 4, an electron beam gun 5, and rollers 6 and 7, all of which are disposed in a thin-film deposition system 8. The supporting roller 2 supports a current collector 1 while conveying it around the outer circumferential surface. The crucible 4 supplies and melts an evaporation source material 3, which is an evaporation source. The electron beam gun 5 is for heating the evaporation source. The rollers 6 and 7 are for transferring the current collector in a direction A or a direction B. In this kind of evaporation system, as illustrated in FIG. 1, an electron beam C emitted from the electron beam gun 5 is applied to the evaporation source material 3 so that the evaporation source material 3 is heated. The heated evaporation source material 3 melts and evaporates, and the evaporated vapor condenses on the current collector 1. Thereby a thin film composed of the evaporation source material 3 is deposited on the current collector 1. By evaporating the evaporation source material 3 while transferring the current collector 1 at a constant velocity, a thin film with a uniform film thickness is deposited over the entire surface of the current collector 1.

When the electron beam is applied to the evaporation source material 3 and the evaporation source material 3 is heated to evaporate, so-called bumping of the evaporation source material 3 can take place because of the influence of gases and impurities that contaminate the interior of the evaporation source material 3, and the phenomenon of scattering particles, known as splash, may occur. These particles adhere onto the electrode surface, and result in formation of protrusions on the electrode surface.

Techniques for preventing the bumping of the evaporation source material have been proposed. Japanese Published Unexamined Patent Application Nos. 5-171412 and 7-34224 describe a technique to control a fabrication method of the evaporation source material and a technique to control the shape and composition of the evaporation source material, both of which are intended for use in forming a silicon monoxide thin film. Japanese Published Unexamined Patent Application No. 2004-204314 describes a technique to control the procedure of heating the evaporation source material for use in forming a metal thin film. Nevertheless, it has been difficult to completely prevent the bumping of evaporation source material. In particular, in the case of depositing a silicon thin film, techniques to prepare the evaporation source material and to control the procedure of heating the evaporation source material for preventing the bumping have not yet been established and it has been difficult to prevent the bumping phenomenon over a long time period.

BRIEF SUMMARY OF THE INVENTION

Accordingly, it is an object of the present invention to provide a method of manufacturing an electrode for lithium secondary batteries having flat and smooth surfaces and a thin film deposited on a current collector.

The present invention provides a method of manufacturing an electrode for lithium secondary batteries, comprising: depositing a thin film of active material on a current collector; and performing a compression process after depositing the thin film.

The above-described manufacturing method reduces the heights of the protrusions adhered on the electrode surfaces by compressing the electrode surfaces after depositing the thin film, and therefore reduces short-circuit failures in the batteries that employ the electrodes produced according to the method.

As described in the following examples, the short-circuiting of the battery resulting from the protrusions formed on the electrode surfaces due to splash is dependent on the height of the protruding portions. The probability of the short-circuiting increases when the height of the protrusions exceeds a certain value. Therefore, by controlling the height of the protrusions formed on the electrode surfaces to be a predetermined value of 80 μm or less, the short-circuit failures can be lessened. In the present invention, it is preferable to use pressure rollers, which can be incorporated in the thin-film deposition system so that the manufacturing process can be simplified, as the method for compressing the electrode surface.

When carrying out the pressing process for the electrode surfaces with the use of pressure rollers, the heights of the protrusions can be reduced without causing adverse effects on battery performance if the gap between the pressure rollers is set at about 20% to about 100% of the current collector thickness in the compression process. If the degree of the compression is too low, the effect of reducing the heights of the protrusions will be small, while if the degree of the compression is too high, the silicon thin film may peel off or the current collector may rupture.

It is preferable that the current collector to be used in the present invention be formed of a metal that does not alloy with lithium. Examples of such a material include copper, alloys containing copper, nickel, and stainless steels. Examples of the alloys containing copper include phosphor bronze and red brass. When the surfaces or the entirety of the current collector is composed of copper, which has relatively low hardness, among these examples, an effect of burying the protrusions, formed on the electrode surface due to the splash, into the current collector in the compression process is attained, which synergistically enhances the effect of reducing the heights of the protrusions.

The present invention pertains to a method of manufacturing an electrode for lithium secondary batteries and may be applied to the manufacturing of either the negative electrode or the positive electrode. When a material containing silicon is used as the active material, it is generally used for the negative electrode.

The present invention makes it possible to provide an electrode for lithium secondary batteries that has a thin film deposited on the current collector and that has a flat and smooth surface, and thus to reduce the failure of products dramatically. Therefore, the productivity of manufacturing the battery employing the electrode increases.

DETAILED DESCRIPTION OF THE INVENTION

Hereinbelow, the present invention is described in further detail based on preferred embodiments thereof. It should be construed, however, that the present invention is not limited to the following preferred embodiments and various changes and modifications are possible without departing from the scope of the invention.

Embodiments

Preparation of Electrode

Figure 1:
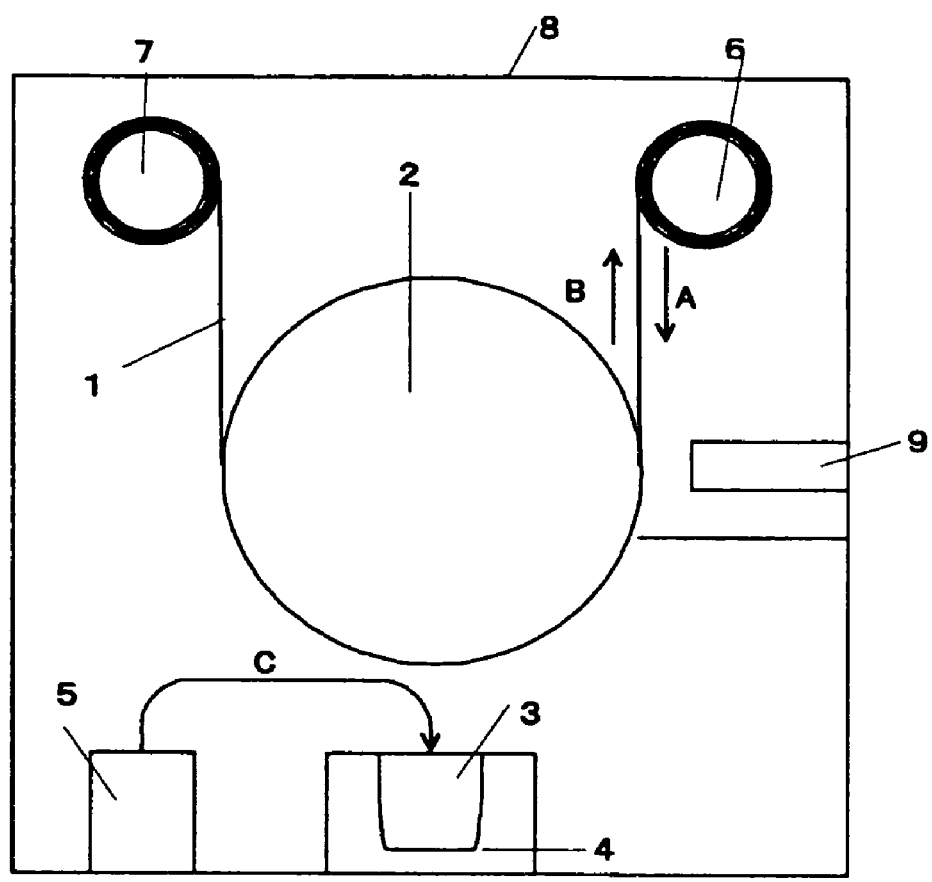
FIG. 1 is a schematic cross-sectional view illustrating a thin-film deposition system used in an embodiment according to the present invention.

Copper was deposited on surfaces of a rolled copper foil (thickness 26 mm) by an electrolytic process to roughen the surfaces, and the surface-roughed copper foil was used as the current collector. The surfaces of the current collector had an arithmetical mean roughness Ra of 0.5 μm. Arithmetical mean roughness Ra is defined in Japanese Industrial Standard (JIS) B 0601, and it can be measured by a contact probe profilometer. The use of the surface-roughed copper foil can prevent a silicon thin film from peeling off from the current collector. Such peeling occurs due to the film stress of the silicon thin film or the stress originating from the expansion/shrinkage in volume of the silicon thin film during charge/discharge. On the current collector thus prepared, a silicon thin film was deposited in the following manner, using the thin-film deposition system as shown in FIG. 1.

The current collector 1 thus prepared was wound around the roller 6, and the current collector 1 was transferred in the direction indicated by the arrow A so as to be wound up by the roller 7. The current collector 1 was irradiated with an ion beam from an ion gun 9 and thereafter a silicon thin film was deposited thereon. In the deposition, the current collector 1 successively passes through a region opposing the ion gun 9 and a region opposing the crucible 4, and thus, a surface of the current collector 1 undergoes the ion irradiation process, and a silicon thin film is deposited thereon.

A partition is provided between the region in which the ion gun 9 is provided and the region in which the crucible 4 and the electron beam gun 5 are provided, for independently controlling the pressures of the regions in which the respective processes are performed. The ion irradiation process is a process for improving the adhesion of the silicon thin film to the current collector. Argon was used for the irradiation ion species.

The evaporation source material 3 used was a single crystal silicon produced by the float-zone method. The single crystal silicon produced by the float-zone method tends to have less amounts of contaminating impurities than a single crystal silicon produced by the Czochralski method. For example, the oxygen content reduces from about 1015-1016 atoms/cm$^3$ to about 1017-1019 atoms/cm$^3$. When a single crystal silicon produced by the float-zone method is used for the evaporation source material 3, bumping that occurs during the silicon thin film deposition is suppressed in comparison with the case that a single crystal silicon produced by the Czochralski method is used. As the crucible 4, a water-cooled crucible made of copper was used.

The ion irradiation in the present embodiment was conducted with a pressure of 0.05 Pa and at an ion current density of 0.27 mA/cm$^2$. The formation of the silicon thin film by electron beam evaporation was conducted with a pressure of 0.019 Pa and at an electron beam gun power of 13 kW. The transferring speed of the current collector was set at 0.35 m/min., and a 15 m region along the transfer direction of the current collector was subjected to the ion irradiation and the silicon thin film deposition.

The current collector 1 on one side of which the silicon thin film was deposited in the procedure described above was wound up around the roller 7, and then taken out of the thin-film deposition system 8 in an as-rolled state. The silicon thin film was formed only on the inner surface side of the roll of the current collector 1 taken out from the thin-film deposition system 8.

Next, the current collector 1 taken out from thin-film deposition system 8 was turned over inside out using a roll reversing apparatus, and thereafter, the current collector 1 was mounted onto the roller 6 of the thin-film deposition system 8. At this point, the silicon thin film is formed only on the outer surface side of the roll of the current collector 1. Then, the surface of the current collector 1 on which the silicon thin film was not formed was subjected to the ion irradiation and the silicon thin film deposition in the same procedure as described above.

A cross section of the current collector 1 on which the silicon thin films were deposited was observed with SEM to measure the film thickness of the silicon thin films, and it was found that the silicon thin films with a thickness of about 7 μm were deposited on the respective sides of the current collector. The deposition rate of the silicon thin film was about 2.5 μm·m/min. in the present embodiment.

Inspection of Protrusions

A 1200 cm$^2$ region of the electrode prepared according to the above-described procedure was visually observed while being irradiated with light applied diagonally with respect to the electrode, and thereby the number and positions of protrusions formed on the electrode surface were determined. Next, using an optical microscope, the sizes (maximum dimensions along the horizontal orientation of the electrode surface) and heights of the protrusions, which were confirmed by the visual observation, were measured. The height of a protrusion was determined from the difference in the focal points between the flat surface and the peak point of the protrusion.

Figure 2:
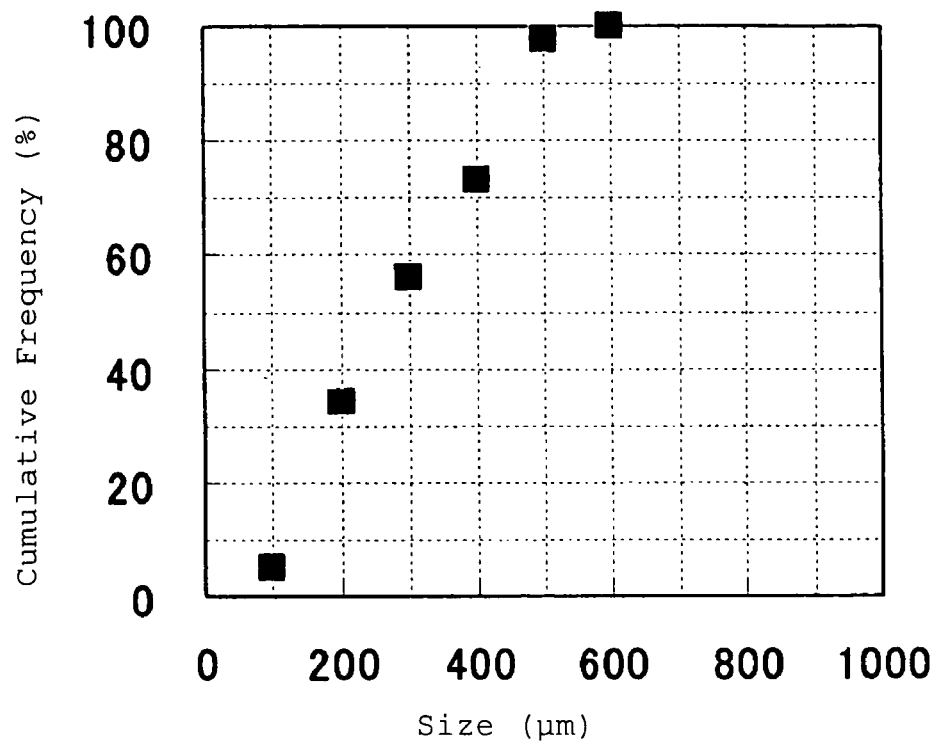
FIG. 2 shows the results of measurements of sizes of protrusions before a pressing process.
Figure 3:
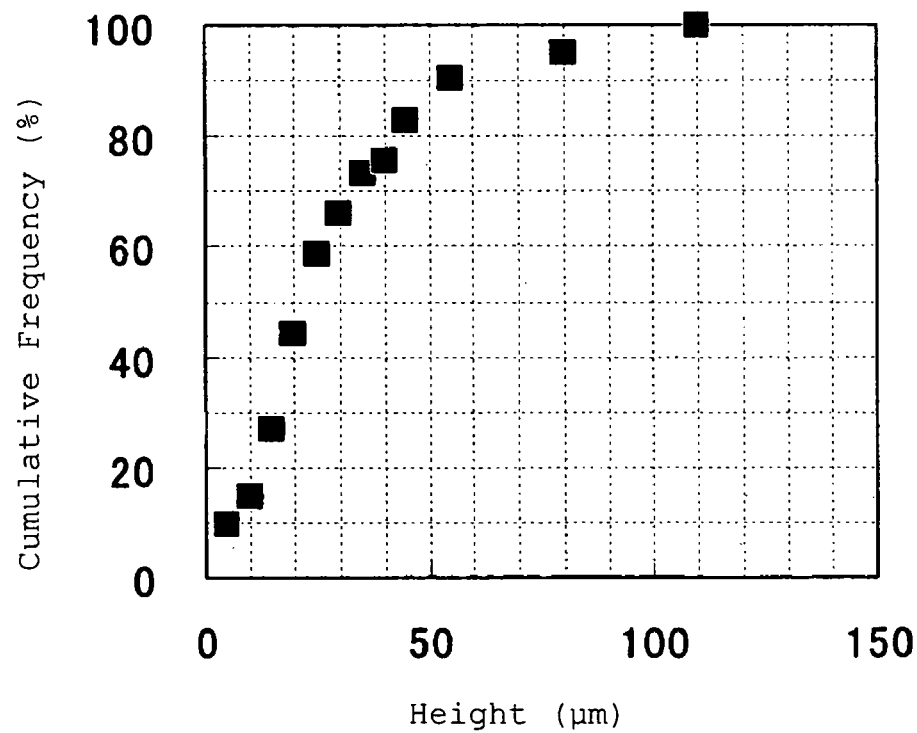
FIG. 3 shows the results of measurements of heights of protrusions before the pressing process.

The number of the protrusions formed on the electrode surface was about 0.03 per 1 cm$^2$ of the electrode area. The results of measurements of the sizes and heights of the protrusions are shown in FIGS. 2 and 3, respectively. In FIGS. 2 and 3, the horizontal axes represent sizes and heights of protrusions, respectively, and the vertical axes represent the cumulative frequency of the sizes of protrusions and heights of protrusions, respectively. The protrusions were distributed in sizes of 600 μm or less and heights of 110 μm or less.

Pressing Process for Electrode

Using a rolling machine having 15 cm-diameter pressure rollers, a portion of the electrode that underwent the inspection of protrusions was subjected to a pressing process wherein the gap between the pressure rollers was set at 8 μm, the revolution of the rollers was 200 rpm, and the number of times that the electrode was to be passed through the rollers was two times.

Figure 4:
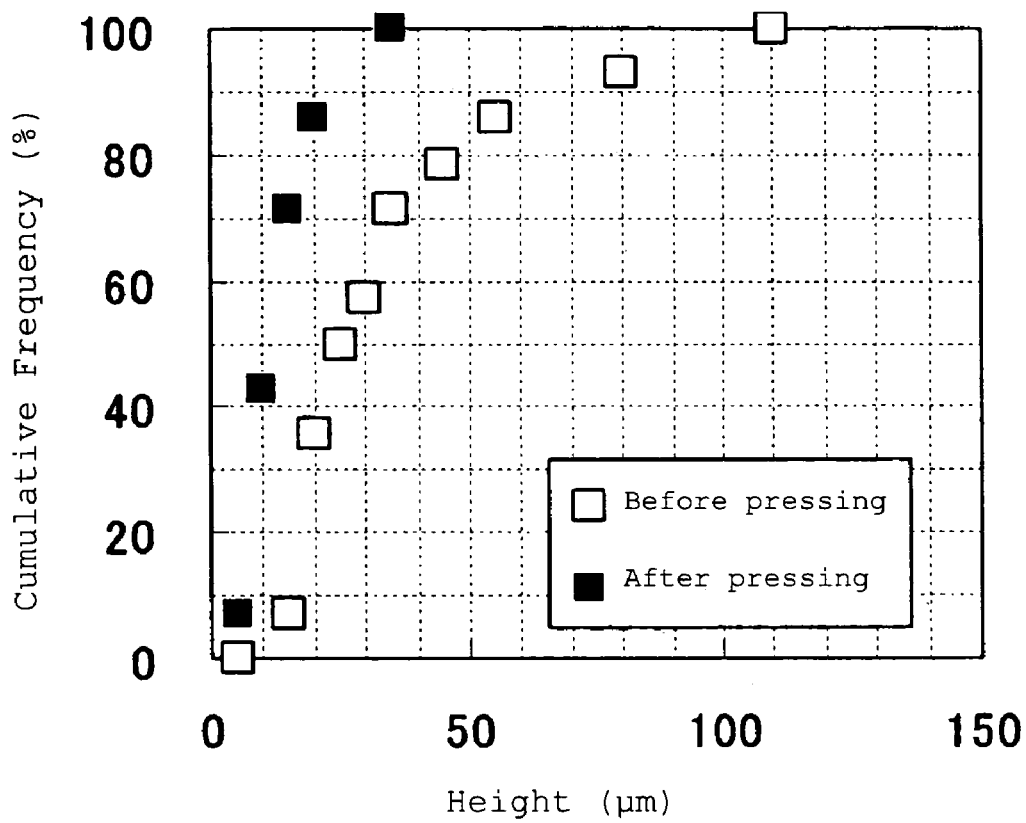
FIG. 4 shows the results of measurements of heights of protrusions before and after the pressing process.

Next, the electrode after the pressing process was inspected using an optical microscope, and the heights of the protrusions that had been detected before the pressing process were determined in the same manner as that used before the pressing process. The results of measurements of the heights of the protrusions before and after the pressing process are shown in FIG. 4. In FIG. 4, the horizontal axis represents heights of protrusions, and the vertical axis represents cumulative frequency of heights of protrusions. As a result of the pressing process, the maximum value of the heights of the protrusions formed on the electrode surface was reduced from 110 μm to 35 μm, and the distribution of heights of the protrusions shifted toward lower heights.

Preparation of Negative Electrode

The electrode subjected to the pressing process was cut out into a size of 3.5 cm×34 cm and current collector tabs were attached thereto, whereby negative electrodes a1, a2, and a3 were prepared. As comparative examples, negative electrodes b1 to b11 were prepared using an electrode that was not subjected to the pressing process.

Table 1 summarizes the results of measurements of heights of protrusions formed on the surfaces of the negative electrodes a1, a2, and a3. Table 1 also shows whether or not short-circuiting occurred, charge-discharge efficiency, and capacity retention ratio, which are discussed later. In the negative electrodes a1, a2, and a3, the heights of the protrusions were reduced by the pressing process, and the heights of the protrusions were 40 μm or less.

TABLE 1

| Negative electrode | | a1 | | a2 | | a3 | |
|---|---|---|---|---|---|---|---|
| | Measurement | Before pressing process | After pressing process | Before pressing process | After pressing process | Before pressing process | After pressing process |
| Distribution of protrusions by height | 20 μm or less | 4 | 6 | 1 | 2 | 0 | 4 |
| | 21-40 μm | 2 | 0 | 1 | 0 | 2 | 2 |
| | 41-60 μm | 0 | 0 | 0 | 0 | 2 | 0 |
| | 61-80 μm | 0 | 0 | 0 | 0 | 1 | 0 |
| | 81-100 μm | 0 | 0 | 0 | 0 | 0 | 0 |
| | 101-120 μm | 0 | 0 | 0 | 0 | 1 | 0 |
| | 121 μm or greater | 0 | 0 | 0 | 0 | 0 | 0 |
| | Total | 6 | 6 | 2 | 2 | 6 | 6 |
| Short-circuit | | — | No | — | No | — | No |
| Charge-discharge efficiency (%) | | — | 87.5 | — | 87.5 | — | 87.4 |
| Capacity retention ratio (%) | | — | 98.2 | — | 98.4 | — | 98.3 |

In addition, Table 2 summarizes the results of measurements of the heights of protrusions formed on the surfaces of the negative electrodes b1 to b11. Table 2 also shows whether or not short-circuiting occurred, charge-discharge efficiency, and capacity retention ratio, which are discussed later.

TABLE 2

| Negative electrode | | b1 | b2 | b3 | b4 | b5 | b6 | b7 | b8 | b9 | b10 | b11 |
|---|---|---|---|---|---|---|---|---|---|---|---|---|
| Distribution of protrusions by height | 20 μm or less | 0 | 0 | 2 | 1 | 1 | 2 | 2 | 2 | 1 | 2 | 0 |
| | 21-40 μm | 0 | 0 | 0 | 0 | 0 | 0 | 3 | 2 | 1 | 0 | 2 |
| | 41-60 μm | 0 | 0 | 0 | 0 | 0 | 0 | 0 | 0 | 1 | 0 | 2 |
| | 61-80 μm | 0 | 0 | 0 | 0 | 0 | 0 | 0 | 0 | 0 | 1 | 1 |
| | 81-100 μm | 0 | 0 | 0 | 0 | 0 | 0 | 0 | 0 | 0 | 0 | 0 |
| | 101-120 μm | 0 | 0 | 0 | 0 | 0 | 0 | 0 | 0 | 0 | 0 | 1 |
| | 121 μm or greater | 0 | 0 | 0 | 0 | 0 | 0 | 0 | 0 | 0 | 0 | 0 |
| | Total | 0 | 0 | 2 | 1 | 1 | 2 | 5 | 4 | 3 | 3 | 6 |
| Short-circuit | | No | No | No | No | No | No | No | No | No | No | Yes |
| Charge-discharge efficiency (%) | | 84.4 | 84.6 | 83.8 | 84.9 | 84.0 | 84.1 | 84.8 | 83.8 | 84.4 | 84.1 | — |
| Capacity retention ratio (%) | | 99.6 | 99.8 | 99.8 | 99.6 | 99.6 | 99.7 | 99.7 | 99.7 | 99.7 | 99.5 | — |

Preparation of Positive Electrode $Li_2CO_3$ and $CoCO_3$ were used as starting materials, and the materials were weighed so that the atomic ratio of Li:Co was 1:1, followed by mixing them in a mortar. The resultant mixture was pressure-formed by pressing it with a stamping die with a diameter of 17 mm, and then baked at 800° C. in the air for 24 hours, to thus obtain a baked material of $LiCoO_2$. The baked material was then pulverized in a mortar to form a powder with an average particle size of 20 µm.

Then, 90 parts by weight of the resultant $LiCoO_2$ powder was mixed with a 5 weight % N-methylpyrrolidone solution containing 5 parts by weight of artificial graphite powder as a conductive agent and 5 parts by weight of polyvinylidene fluoride as a binder agent, to thus prepare a positive electrode mixture slurry. The resultant positive electrode mixture slurry was applied onto an aluminum foil with a thickness of 15 µm serving as a current collector. The resultant material was dried and thereafter pressure-rolled forming a positive electrode active material layer with a thickness of 65 µm, and a current collector tab was attached thereto. Thus, a positive electrode was prepared.

Preparation of Electrolyte Solution $LiPF_6$ was dissolved at a concentration of 1 mole/liter into a mixed solvent of 3:7 volume ratio of ethylene carbonate and diethyl carbonate to thus prepare an electrolyte solution.

Preparation of Battery

The positive electrode and each of the negative electrodes prepared in the above-described manner were overlapped facing each other with a polyethylene separator with a thickness of 16 µm interposed therebetween. Thereafter, they were wound up and pressed into a flat shape, to thus prepare an electrode assembly. In a glove box under an argon atmosphere, each electrode assembly was inserted into a battery case made of 0.11 mm-thick aluminum laminate, and the electrolyte solution was filled therein, followed by sealing the battery case.

Figure 5:
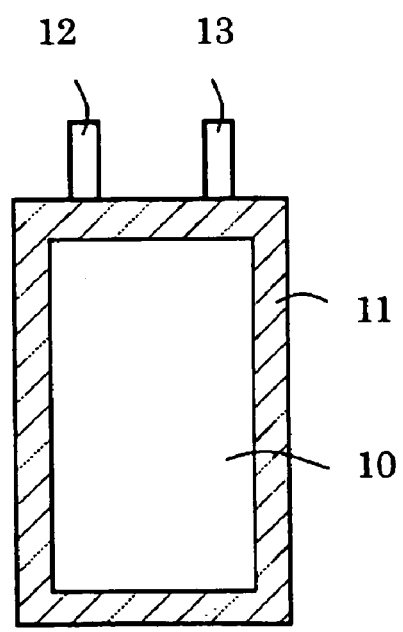
FIG. 5 is a plan view illustrating a lithium secondary battery fabricated in accordance with embodiments of the present invention.

FIG. 5 shows a plan view of each of the lithium secondary batteries thus fabricated. The peripheral portions of the aluminum laminate battery case 10 were heat sealed to form a sealed portion 11, whereby the electrode assembly and the electrolyte solution were accommodated in the hermetically-sealed bag. A positive electrode current collector tab 12 and a negative electrode current collector tab 13 stick out upward from the battery case 10.

Evaluation of Charge-Discharge Performance and Short-Circuiting

Using the batteries fabricated in accordance with the above-described manner, charge-discharge cycle performance was evaluated. The batteries were charged at 25° C. with a current of 50 mA to 4.2 V, and thereafter discharged at a current of 50 mA to 2.75 V. This process was taken as one charge-discharge cycle. This charge-discharge cycle was repeated 5 times, and the charge capacities and discharge capacities at the first cycle and the fifth cycle were evaluated. In addition, whether or not short-circuiting occurred was determined from the voltage values in the evaluation of the charge-discharge cycle performance.

The results of the evaluation for the batteries that employed the negative electrodes a1, a2, and a3 are shown in Table 1, and the results of the evaluation for the batteries that employed the negative electrodes b1 to b11 are shown in Table 2. The charge-discharge efficiencies shown in Tables 1 and 2 were calculated using the following equation 1:

(Charge-discharge efficiency)=(Discharge capacity at the first cycle)/(Charge capacity at the first cycle)×100. Eq. 1:

The capacity retention ratios shown in Tables 1 and 2 were calculated using the following equation 2:

(Capacity retention ratio)=(Discharge capacity at the fifth cycle)/(Discharge capacity at the first cycle)×100 Eq. 2:

The battery that employed the negative electrode b11 showed a voltage of 0 V immediately after the battery was fabricated, indicating that short-circuiting had occurred, so neither the charge-discharge efficiency nor capacity retention ratio could be evaluated. It is believed that because the negative electrode b11 had protrusions with a height of higher than 100 µm formed on the surface, the protrusions on the negative electrode surface penetrated the separator and came into contact with the positive electrode, causing a short-circuit failure. In the negative electrodes other than the negative electrode b11, the heights of the protrusions formed on the surface were 80 µm or less, and no short-circuiting occurred in the batteries that employed these other negative electrodes after the charge-discharge at the fifth cycle. Thus, when a height of the protrusions formed on a negative electrode surface exceeded 80 µm, the probability of short-circuit failure in the batteries increased.

The negative electrode a3 had protrusions with a height of greater than 100 µm before the pressing process, but the height of the protrusions was reduced by the pressing process to 40 µm or less. Thus, it is believed that the battery that employed the negative electrode a3 caused no short-circuit failure because the pressing process reduced the heights of the protrusions formed on the negative electrode surface.

The batteries that employed the negative electrodes a1 to a3 exhibited good charge-discharge efficiencies and capacity retention ratios comparable to those of the batteries using the negative electrodes b1 and b2. This demonstrates that the battery employing the negative electrode in which the height of the protruding portions on the negative electrode surface has been reduced by the pressing process shows a performance comparable to the battery using the negative electrode in which no protrusion is formed on the surface. Therefore, the pressing process for reducing the heights of the protrusions formed on the negative electrode surface causes no adverse effect on the charge-discharge cycle performance of the batteries fabricated. As will be understood clearly from the above-described results, the present invention makes it possible to provide a manufacturing method of batteries that are safe and excellent in productivity.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

This application claims priority of Japanese patent application No. 2005-096441 filed Mar. 29, 2005, which is incorporated herein by reference.

What is claimed is:

1. A method of manufacturing an electrode for lithium secondary batteries, comprising:

forming a thin film of active material on a current collector by evaporation of the active material whereby a protrusion of the active material having a height of greater than 80 µm is adhered to a surface of the current collector when the thin film is formed; and performing a compression process after the step of depositing the thin film to reduce the height of the protrusion to 80 µm or less.

2. The method according to claim 1, wherein the compression process is performed by a roller press.

3. The method according to claim 1, wherein at least a surface of the current collector comprises copper or an alloy containing copper.

4. The method according to claim 1, wherein the thin film consists essentially of silicon.

5. A method of manufacturing an electrode for lithium secondary batteries, comprising:

forming a thin film of active material on a current collector by vacuum evaporation whereby a protrusion of the active material having a height of greater than 80 µm is adhered to a surface of the current collector when the thin film is formed; and performing a compression process after the step of depositing the thin film to reduce the height of the protrusion to 80 µm or less.

6. The method according to claim 5, wherein the thin film consists essentially of silicon.

7. The method according to claim 5, wherein the compression process is performed by a roller press.

8. The method according to claim 5, wherein at least a surface of the current collector comprises copper or an alloy containing copper.

* * * * *